(12) United States Patent
Chiu et al.

(10) Patent No.: US 7,769,296 B1
(45) Date of Patent: Aug. 3, 2010

(54) ARRANGEMENT FOR REDUCING MULTIPLEXING AND DEMULTIPLEXING COST IN ULTRA LONG HAUL (ULH) ALL-OPTICAL NETWORKS BY MINIMIZING NUMBER OF REQUIRED MUX/DEMUX GROUPS

(75) Inventors: Angela Lan Chiu, Holmdel, NJ (US); Dah-Min D. Hwang, Holmdel, NJ (US); Guangzhi Li, Kearny, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 999 days.

(21) Appl. No.: 11/059,881

(22) Filed: Feb. 17, 2005

(51) Int. Cl.
*H04J 14/02* (2006.01)

(52) U.S. Cl. .............................. 398/83; 398/79; 398/82; 398/42; 398/43; 398/165; 398/141; 398/34; 398/7; 398/14; 398/58; 398/59; 398/60; 385/24; 385/37; 385/16; 385/17; 385/18

(58) Field of Classification Search .................. 398/79, 398/82, 83, 45, 48, 57, 59, 60, 73, 58, 34, 398/7, 14, 42, 43, 140, 141, 165; 385/24, 385/37, 16, 17, 18
See application file for complete search history.

(56) References Cited

U.S. PATENT DOCUMENTS

| | | | |
|---|---|---|---|
| 5,963,348 A | 10/1999 | Oberg | |
| 5,999,288 A | 12/1999 | Ellinas et al. | |
| 6,466,343 B1 | 10/2002 | Lahat et al. | |
| 6,529,300 B1 | 3/2003 | Milton et al. | |
| 6,532,090 B1 | 3/2003 | Doerr et al. | |
| 6,950,609 B2 * | 9/2005 | Marom | 398/83 |
| 2002/0186434 A1 * | 12/2002 | Roorda et al. | 359/128 |
| 2003/0194234 A1 | 10/2003 | Sridhar et al. | |
| 2004/0028410 A1 | 2/2004 | Doh et al. | |
| 2004/0208558 A1 | 10/2004 | Roorda et al. | |

* cited by examiner

*Primary Examiner*—Hanh Phan

(57) ABSTRACT

Multiplex-demultiplex (mux/demux) "groups" multiplex and demultiplex a predetermined maximum number of optical wavelengths. A method for assigning wavelengths of fiber links and mux/demux groups to given traffic (or traffic segments) in an optical communications network, minimizes over all terminals a total number of mux/demux groups required. The method (FIG. 5) involves (510) sorting the terminals in order of size of load. Further, for each traffic segment between pairs of first and second terminals, the method involves (516) assigning a smallest wavelength that is available between the first and second terminals and that is available on the segment path between the terminals; and in the terminals, (518) deploying mux/demux groups supporting the assigned wavelengths. A modified method (FIGS. 6A, 6B), as well as a method for dynamically assigning and deploying newly arriving traffic segments (FIG. 7), are also provided.

19 Claims, 6 Drawing Sheets

LIGHTLOAD-FIRST GREEDY WAVELENGTH ASSIGNMENT (PLAN AHEAD)

MODIFIED LIGHTLOAD-FIRST METHOD

ARRANGEMENT FOR REDUCING MULTIPLEXING AND DEMULTIPLEXING COST IN ULTRA LONG HAUL (ULH) ALL-OPTICAL NETWORKS BY MINIMIZING NUMBER OF REQUIRED MUX/DEMUX GROUPS

BACKGROUND OF THE INVENTION

1. Field of the Invention

The invention relates to arrangements for minimizing multiplexing and demultiplexing (mux/demux) costs, especially in ultra long haul (ULH) all-optical networks. More specifically, the invention is directed to methods of rearranging traffic segment processing order and/or pre-reserving some mux/demux group slots, so as to minimize a total number of mux/demux groups.

2. Related Art

After many years of research and industry efforts, ultra long haul (ULH) technologies for dense-wavelength-domain-multiplexing (DWDM) transport have become more mature, and carriers are deploying such technology for fast provisioning and capital savings. (See A. Chiu and Chang Yu, "Economic Benefits of Transparent OXC Networks as Compared to Long Systems with OADM's," *OFC*2003, Atlanta. See also A. F. Wallace, "Ultra long-haul DWDM: network economics," *OFC* 2001, TuT1-T1-2 vol. 2. These documents, as well as all other documents cited in this specification, are incorporated herein by reference in their entirety.)

An ULH all-optical network has a number of nodes for adding/dropping traffic and the links with optical amplifiers (OAs, also know as in-line amplifiers, ILAs) connecting the nodes. The nodes are usually multi-degree optical add/drop multiplexers (OADM) 104 (FIG. 1) with wavelength blocking and/or wavelength selection switching capability. The traditional end terminal (ET, also be called half OADM or Degree-1 OADM) has only one termination point (or called terminal in this disclosure) to serve the spur end of the network. The traditional OADM has two terminals and is referred as Degree-2 OADM. A network junction node with 3 or 4 terminals is a Degree-3 or Degree-4 OADM, also called a photonic cross connector (PXC) 102 (FIG. 1).

A network link terminates within a switching node at a "termination point (TP)", or simply a "terminal". Each terminal has proper mux/demux structure for adding/dropping chosen wavelengths. It is possible to use an additional degree in a node to support all add/drop traffic with one terminal. The pros and cons of this architecture are addressed by J. Strand and A. Chiu, "Realizing the Advantages of Optical Reconfigurability and Restoration with Integrated Optical Cross-Connects," *Journal of Lightwave Technology*, Vol. 21, No. 11, November 2003. A wavelength connection is added and dropped at the terminals through a pair of optical-electrical-optical (OEO) transponders. If the distance between the add/drop points is beyond the reach of the ULH technology, or a unique wavelength cannot be found along the whole path, a pair of back-to-back transponders or a through transponder can be used in an intermediate node to regenerate and/or convert the wavelength, again via proper mux/demux structures 110 (FIG. 1).

The conventional mux/demux architecture has a fixed mux/demux structure where each slot corresponds to a particular wavelength. Then, to set up a connection between two terminals, not only does a wavelength need to be available along the path, but also the same mux/demux slot must be available at both terminals.

The mux/demux structure represents a significant fraction of the total network cost. To reduce both initial capital outlay and subsequent growth cost, the mux/demux structure usually is divided into mux/demux "groups" that can be installed subsequently when needed, as illustrated in blowup 110 (FIG. 1). In general:

$$N = \frac{W}{K}$$

in which:

N is the total number of mux/demux "groups" (typically, N is 2, 4, 8 . . . );

W is the total number of wavelengths per fiber (for example, 80, 160, . . . ); and K is the number of wavelengths per mux/demux "group" (for example, 10, 20, 40, . . . )

Deploying the mux/demux structure in groups poses no planning problem for the traditional point-to-point long haul (LH) systems: One simply deploys the same mux/demux group at both end terminals as the existing ones exhausted. For LH systems with one or two OADM between the two end terminals, one typically assigns a wavelength-band for OADM traffic; that is, the OADM can only add/drop wavelengths from a pre-determined wavelength-band. Using LH systems to support nationwide traffic, all wavelengths must be regenerated at the end terminals. Therefore, wavelength planning is confined within each LH system between two end terminals. Wavelength planning is not a problem as long as the number of OADM between two end terminals is small.

However, for ULH networks having dozens of multi-degree OADMs, minimizing wavelength blocking and regeneration becomes a challenging problem. To simplify the problem, conventional wavelength constraint studies (see P. Raghavan and E. Upfal, "Efficient routing in all-optical networks," *Proc. 26th ACM Symp. on Theory of Computing*, 1994, New York, pp. 134-143) assume "any-wavelength-to-any-node" deployment requires a full mux/demux structure at every terminal. Undesirably, this assumption represents a substantial increase of initial capital cost. It is estimated that the total mux/demux cost could reach 60% of the total initial equipment capital—more than the combined cost of all optical amplifiers, wavelength blockers, and wavelength selection switches in the network. In a typical nationwide network, a large fraction of terminals are minor terminals (only one mux/demux group is enough) with a few add/drop wavelengths since most of the wavelengths are express or "through" wavelengths. No carrier has the luxury to deploy a full mux/demux structure at every terminal of each node, just for the convenience of wavelength assignment.

The problem of wavelength assignment to reduce mux/demux cost disappears if the mux/demux architecture has "full tunability"—that is, if each slot on the mux/demux structure can be tuned to any wavelength. One simply installs mux/demux groups with enough slots for the number of add/drop wavelengths. However, the per-slot cost in a fully tunable mux/demux structure is much higher than that in a fixed mux/demux structure.

To compromise between performance and cost, some DWDM suppliers offer "partially-tunable" architectures where the W wavelengths are divided into M wavelength bands, and a slot on a mux/demux group is tunable within the corresponding wavelength band. "Partially-tunable" architectures provide some flexibility in wavelength assignment. However, to support an any-wavelength-to-any-node deployment approach, one still needs at least one mux/demux group per tunable wavelength-band in every terminal that increases the total mux/demux equipment cost.

Applicants have realized that, similar to the fixed mux/demux architecture, proper wavelength assignment heuristic algorithms can reduce the number of mux/demux groups in the partially tunable mux/demux architecture. It may become justifiable to deploy the partially tunable mux/demux architecture even if the per-slot cost is higher than that of the fixed mux/demux architecture.

A wide variety of schemes of assigning wavelengths have been proposed.

U.S. Pat. No. 5,963,348 (Oberg) discloses a method for assigning wavelengths in an optical bus network, the network having two pairs of optical fibers.

U.S. Pat. No. 5,999,288 (Ellinas et al.) discloses a method for systematically selecting a wavelength assignment for node pair connections without violating "color clash" (wavelength conflict) rules.

U.S. Pat. No. 6,466,343 (Lahat et al.) discloses a system for assigning optical wavelengths in a wavelength division multiplexing (WDM) switch, the method involving a request table storing requests from plural interface cards.

U.S. Pat. No. 6,529,300 (Milton et al.) discloses an interface at each node in a network performing the basic functions of dropping a band associated with the node, adding a band carrying traffic for another node, and passively forwarding other bands through the node.

U.S. Pat. No. 6,532,090 (Doerr et al.) discloses a wavelength selective cross-connect (WSC) that involves a set of wavelength interchange modules that allows the WSC structure to be simplified.

U.S. Patent Application Publication No. 2003/0194234 (Sridhar et al.) discloses method for dynamic wavelength assignment that adds a minimum number of optical/electronic and electronic/optical (OE/EO) interfaces.

U.S. Patent Application Publication No. 2004/0028410 (Doh et al.) discloses a method for assigning a minimum number of required wavelengths in a WDM ring network.

U.S. Patent Application Publication No. 2004/0208558 (Roorda et al.) discloses a method of wavelength routing in a metro network subtended off a wavelength switched (agile) core network.

From the foregoing survey of conventional arrangements, it is apparent that conventional artisans have not paid adequate attention to the question of reducing costs of mux/demux groups in assigning wavelengths, especially in ultra long haul (ULH) optical networks. Thus, none of the conventional arrangements appear to have solved the problems described above, and there is a need in the art for an arrangement that reduces the costs in networks by assigning wavelengths in such a manner as to minimize the number of mux/demux "groups" required. There is a need for practical wavelength assignment heuristics for deploying fixed mux/demux structures ("groups") as needed, and without constraining the future network growth. An effective heuristic could significantly reduce capital costs, both initially and over the entire network life cycle.

SUMMARY

Multiplex-demultiplex (mux/demux) "groups" multiplex and demultiplex a predetermined maximum number of optical wavelengths. A method for assigning wavelengths of fiber links and mux/demux groups to given traffic (or traffic segments) in an optical communications network, minimizes over all terminals a total number of mux/demux groups required. The method involves sorting the terminals in order of size of load. Further, for each traffic segment between pairs of first and second terminals, the method involves assigning a smallest wavelength that is available between the first and second terminals and that is available on the segment path between the terminals; and, in the terminals, deploying mux/demux groups supporting the assigned wavelengths. A modified method, as well as a method for dynamically assigning and deploying newly arriving traffic segments, are also provided.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIG. 2A shows the results of a first-fit greedy wavelength assignment approach, and FIG. 2B shows the results when a plan ahead approach is adopted;

FIG. 3A shows results according to the lightload-first greedy wavelength assignment method, and FIG. 3B shows wavelength assignment according to a modified lightload-first method;

DETAILED DESCRIPTION

Figure 1:
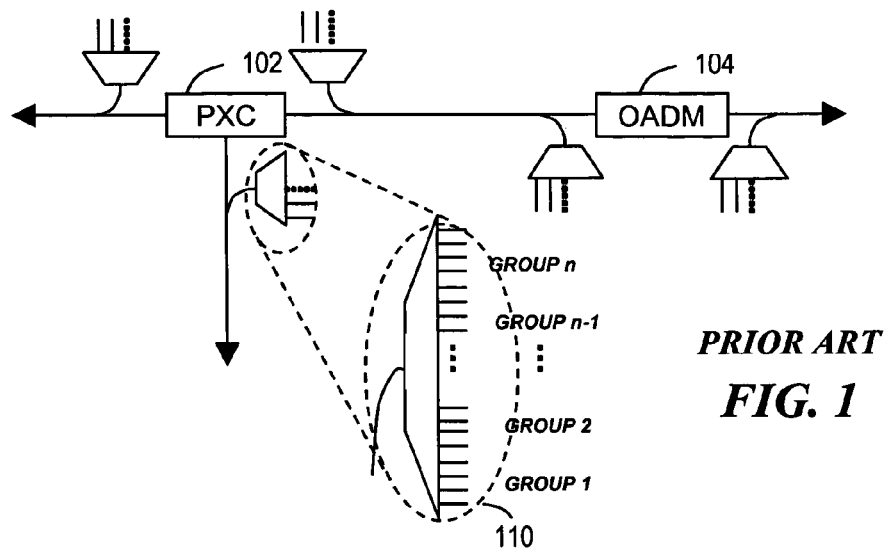
FIG. 1 shows an optical network including terminals, a PXC node, and an OADM node, as well as the expanded terminal (blowup) 110 illustrating a typical multi-stage architecture that allows mux/demux "groups" to be added as needed to reduce capital costs.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Various terms that are used in this specification are to be given their broadest reasonable interpretation when used to interpret the claims.

Moreover, features and procedures whose implementations are well known to those skilled in the art are omitted for brevity. For example, the selection, construction and/or use of elements employed in optical communications (such as repeaters, couplers, switches, OADMs, PXCs, mux/demux groups, wavelength blocking elements, terminals, and the like) are readily accomplished by those skilled in the art, and thus their details may be omitted. Also, common network communications techniques and network management techniques may be only briefly mentioned or illustrated, their details being well known by skilled artisans. Thus, the steps involved in methods described herein may be readily implemented by those skilled in the art without undue experimentation.

Figure 2A:
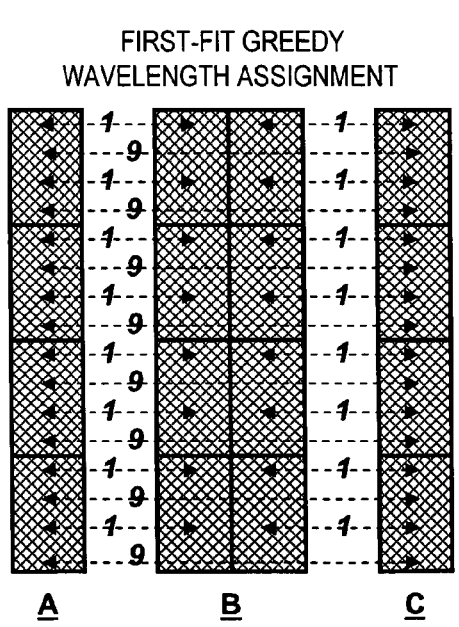
FIGS. 2A and 2B (collectively called "FIG. 2") illustrate mux/demux groups at three nodes, in which each terminal can have four mux/demux groups that each support up to 20 wavelengths; cross-hatched (shaded) boxes indicate installed mux/demux groups, whereas unshaded boxes indicate where mux/demux groups do not have to be installed; assuming every tenth wavelength is added/dropped at OADM B.
Figure 2B:
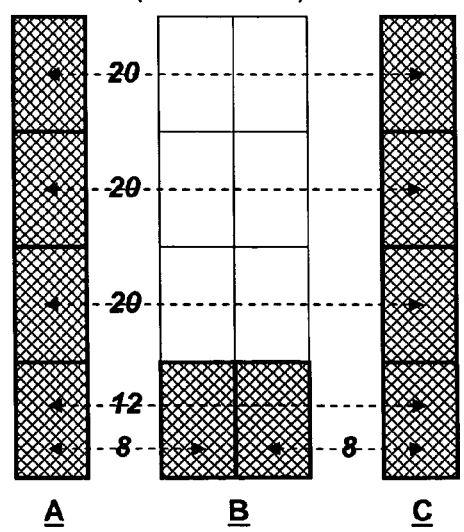

Consider the simple example shown in FIGS. 2A and 2B. There are two end terminals A and C, with an OADM B between A and C. For illustration, it is assumed the mux/demux structure can be divided into 4 mux/demux groups, each supporting 20 fixed wavelengths. Each cross-hatched (shaded) box indicates an installed mux/demux group, with the unshaded boxes indicating mux/demux groups that do not have to be installed.

It is further assumed that OADM B is a minor node (only one mux/demux group for each terminal) and that every tenth wavelength is added/dropped at B. That is, there are 8 add/drop wavelengths and 72 express ("through") wavelengths at B when fully loaded.

The result of a first-fit greedy wavelength assignment approach is shown in FIG. 2A. A full 80-channel mux/demux structure at B (eight "groups") is needed in order to supports eight add/drop wavelengths, with 72 empty slots. This is a huge waste of equipment and office space.

On the other hand, if one plans ahead, it is clear in this example that one needs only one mux/demux group deployed in each direction of B, as shown in FIG. 2B, reserving eight wavelengths in the first mux/demux group for adding/dropping traffic at OADM B. When the 13th express wavelength arrives, one may install and use a second mux/demux group in both A and C, even through there are still empty slots in the first mux/demux group. Thus, when fully loaded, the plan-ahead approach (FIG. 2B) saves almost 75% of the mux/demux equipment and cost at OADM B as compared with FIG. 2A.

When the number of nodes in a linear chain increases beyond the example in FIGS. 2A, 2B, the number of wavelength-bands needing to be reserved for connectivity between each node pair increases with the square of the number of nodes. The problem becomes very complicated when the number of nodes exceeds 5 or 6.

To further reduce capital cost and operational cost, carriers upgrade their ULH networks from a set of point-to-point ULH systems to all-optical (i.e., transparent) mesh networks. This can be realized by converting the end terminals and degree-2 OADMs to general degree-n OADMs—switching nodes with optical express wavelengths between any directions. See A. Boskovic, et al, "Broadcast and Select OADM nodes: Application and Performance Trade-offs," *OFC* 2002, Anaheim. See also E. Ranalli et al., "Liquid-crystal based wavelength selectable crossconnect," *ECOC*, pp. 68-69, 1999. See also J. Strand and A. Chiu, "Realizing the Advantages of Optical Reconfigurability and Restoration with Integrated Optical Cross-Connects," *Journal of Lightwave Technology*, Vol. 21, No. 11, November 2003. This is also called Integrated Optical Cross-Connect (IOXC) since the cross-connect node is an integrated part of the DWDM transmission. In a transparent mesh network, a node can have connection requests to any other node that is within the ULH reach, instead of the few nodes on the same linear system before. As a result, the wavelength assignment problem becomes much more complex in a transparent network.

The partially tunable mux/demux structures also use similar multi-stage structure as the fixed one, but with the N mux/demux groups divided into M wavelength bands. Each slot in a mux/demux group can be tuned within a pre-determined wavelength-band. For example, the 4 mux/demux groups illustrated in FIGS. 2A, 2B can be divided into two wavelength bands. Each of the 20 slots in the first or second mux/demux group can be tuned to any wavelength between Wavelength 1 and Wavelength 40, while each slot in the third or fourth mux/demux group can be tuned to any wavelength between Wavelength 41 and Wavelength 80. To support "any-wavelength-to-any-node" operation, one needs to deploy at least the first mux/demux group and the third mux/demux group at every terminal, even for the nodes with much less than 20 add/drop wavelengths. Similar to the fixed mux/demux architecture, proper wavelength assignment heuristic approaches reduce the number of mux/demux groups in the partially tunable mux/demux architecture. It may be justifiable to deploy the partially tunable mux/demux architecture even if the per-slot cost is higher than that of the fixed mux/demux architecture.

The above problems are complicated by forecast uncertainty. Wavelength assignment must have the flexibility to adapt as the network grows.

Briefly, the problem may be defined as follows, with reference to FIG. 4. Given:
    a ULH network topology and reach,
    parameter W (wavelengths per fiber),
    parameter K (wavelengths per mux/demux group), and
    a demand matrix of wavelength connections,
the problem is to find routing paths and assign wavelengths to each connection demand such that the total required number of mux/demux groups over all terminals is minimized.

For a mux/demux architecture, wavelengths are assumed to be assigned with IDs from 1 to W such that the n-th mux/demux group, Gn (where n=1 to N, and N=W/K) has slots for wavelengths $(n-1)K+1$ to $nK$. N is the number of mux/demux groups per terminal.

Figure 4:
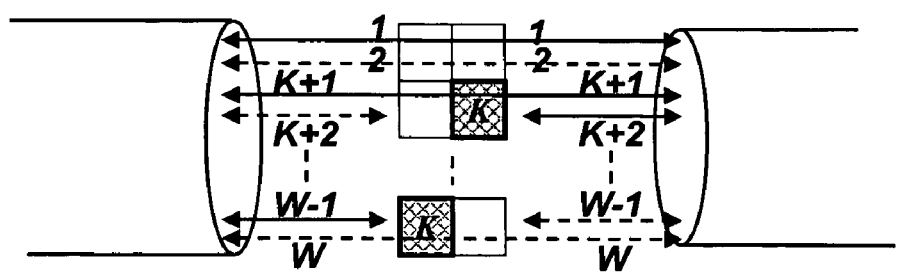
FIG. 4 illustrates the general concept of minimizing the number of mux/demux "groups" required, in which solid lines represent assigned wavelengths and dotted lines designate unassigned wavelengths, and in which shaded boxes indicate installed mux/demux groups while unshaded boxes indicate where mux/demux groups do not have to be installed.

In the FIG. 4 example of a degree-2 node, because the first K wavelengths are either express wavelengths or unassigned wavelengths, no mux/demux groups are needed for them. For the second K wavelengths (K+1 through 2K), only the right side terminal has wavelengths terminated and so requires an installed mux/demux group (shown in cross-hatch); the left side has no wavelength terminated and thus requires no mux/demux group. All of the second K wavelengths at the left side terminal are either express or unassigned. Thus the mux/demux group at the left side need not be installed. Finally, for the last K wavelengths (ending in W), only the left side has wavelengths terminated and needs a mux/demux group installed (shown in cross-hatch); but the right side does not need a mux/demux group.

There are two scenarios in this problem:
    Static scenario with demand forecast (see FIGS. 5, 6A-6B).
        The static scenario is applied at network planning stage; because the demand matrix is given, an off-line implementation may solve it.
    Growth scenario with dynamic demand arrivals (see FIG. 7). The growth scenario is applied after initial system deployment. As demand arrives, the network decides how to route and assign wavelengths without knowing future demands. An on-line implementation solves this problem.

To simplify this problem, one assumes shortest path routing or any other routing scheme, and dedicated terminals where each outgoing fiber pair has its own terminal. Hence, a degree-3 node with three outgoing fiber links can have 3 terminals, with one dedicated to each link. A ULH network with E links would have 2*E terminals since each link has two terminals, named A terminal and Z terminal. Assume each node is assigned a node ID. Then A terminal is at the lower node ID with direction to the higher node ID, while Z terminal is at the higher node ID with direction to the lower node ID.

After routing is applied to each wavelength demand, one splits each demand into one or more ULH traffic segments (or briefly called "segments" in this disclosure). All traffic segments have a distance no longer than the ULH reach, and one wavelength is assigned to each "segment." The segments per demand are connected via regenerators at intermediate offices. In ULH network design, one minimizes the number of regenerators by splitting the demand route from source to destination such that the segments have the maximal allowable length. After generating segments from demands, the problem becomes wavelength assignment on segments such that the total number of mux/demux groups over all terminals is minimized.

A typical nationwide ULH network usually has very inhomogeneous demands between two network nodes. Some node terminals have more terminated wavelength segments than others. Given ULH realistic demands and parameter K (number of wavelengths per mux/demux group), a large percentage of terminals have fewer than K demands. Then, it is cost efficient to keep these small terminals with one mux/demux group only.

Under the static scenario, because the traffic matrix is known in advance, if one assigns wavelengths on traffic segments using first-fit assignment from the most lightly loaded terminal to the most heavily loaded terminal, one should be able to keep these small terminals with the same mux/demux group (see FIG. 2B). First-fit assignment is a simple and efficient method for all-optical network wavelength assignment, which first indexes the wavelengths from 1 to W (W=total number of wavelengths per fiber), and then finds the smallest wavelength that is available on all links along the traffic route.

A "lightload-first" method may be represented as in Table I, in which:

i and j denote terminals t(i) denotes the traffic segment load at terminal i

T(i,j) as the segment load between terminal i and terminal j.

One embodiment of the lightload-first method may involve the steps in Table I:

TABLE I

Lightload-First Method

1. Sort the terminal index from the smallest load to the largest load; that is: t(i) ≦ t(i+1)
2. Start with i=2.
3. For j=1 to i−1, wavelength assignment on segments between i and j, T(i,j),
    3a. Segment available at both i and j
    3b. Segment available on all links on the shortest path between i and j
    3c. Carry out first fit wavelength assignment TABLE I-continued Lightload-First Method 4. Deploy the mux/demux group(s) that support(s) the assigned wavelength(s) accordingly.
5. Update to the next terminal, i=i+1 and go to step 3.

FIG. 2B illustrates how the lightload-first method works. There are four terminals, A(B), B(A), B(C), C(B), where X(Y) means the terminals at node X with fiber to node Y. The final loads on these four terminals are 80, 8, 8, and 80 respectively.

After step 1, the indexes of A(B), B(A), B(C), C(B) correspond to 3, 1, 2, 4.

Start from terminal B(C). Since T(2,1)=0, the method goes to terminal 3, which is A(B). We have T(3,1)=8 and these segments are assigned wavelengths from 1 to 8 respectively, and T(3,2)=0.

The method then goes to step 5 with terminal 4, which is C(B).

For j=1, T(4,1)=0.

For j=2, T(4,2)=8 and these segments are assigned wavelengths 1 to 8 respectively using first-fit.

For j=3, T(4,3)=72 and these segments are assigned wavelengths from 9 to 80 respectively.

In total, only ten mux/demux groups are required in FIG. 2B, a substantial savings over FIG. 2A's sixteen groups.

Figure 5:
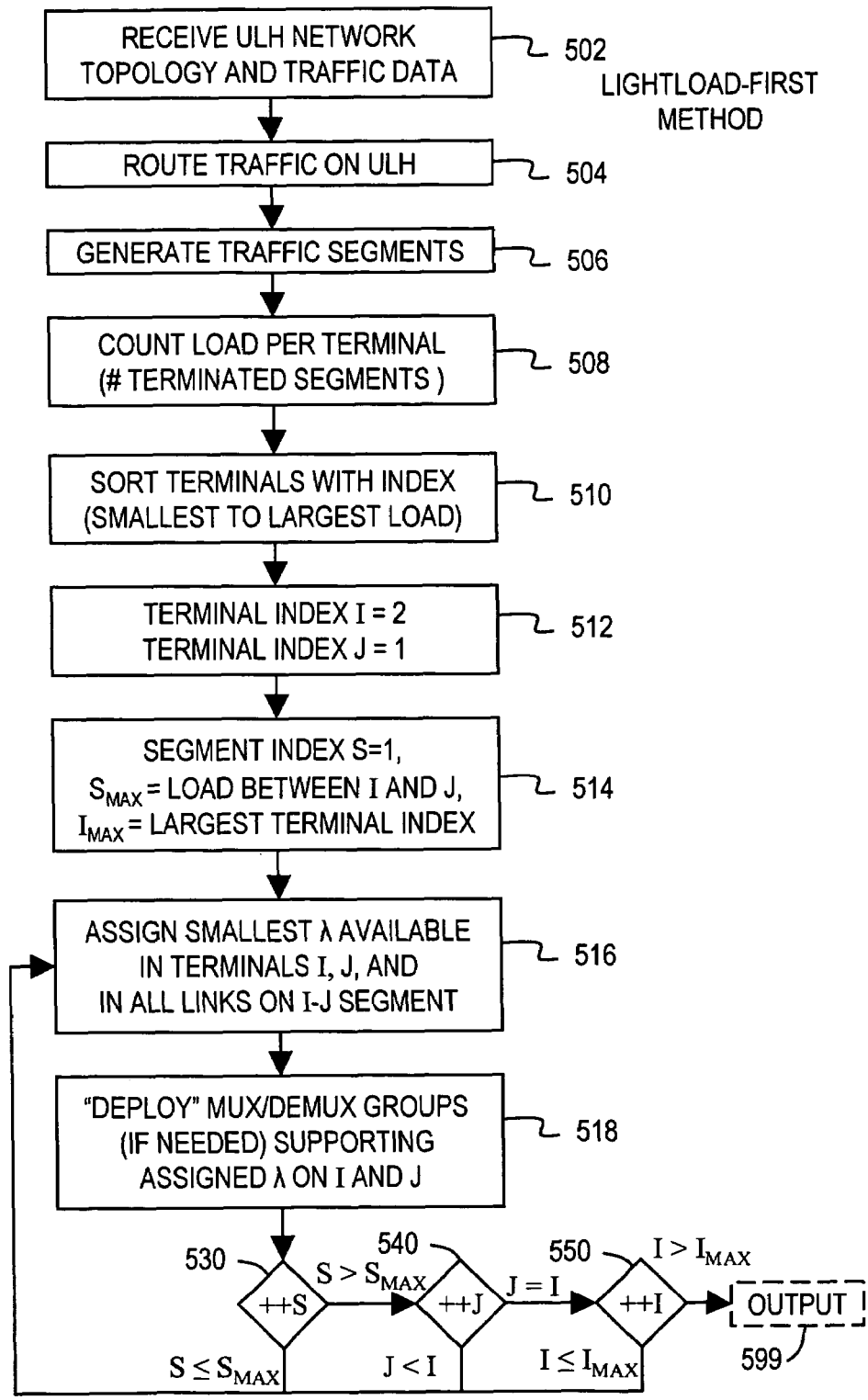
FIG. 5 is a flowchart of one embodiment of a lightload-first method of wavelength assignment.

FIG. 5 is a flowchart of one embodiment of a lightload-first method of wavelength assignment.

Block 502 indicates a preliminary step of receiving data, such as the ULH network's topology and traffic data.

Block 504 indicates the routing of traffic on the ULH. This routing could use any efficient routing scheme, such as shortest path routing, and occurs before the strategic assignment of wavelengths to reduce the number of mux/demux groups as described below.

Block 506 indicates the step of generating the traffic segments. Briefly, a traffic segment may be defined as a partial demand route whose distance is no longer than the ULH reach. One may use any suitable method to generate traffic segments. For example, one method involves always generating the longest available segment from a demand remaining route starting from the source. Then each demand route is split into multiple segments.

Block 508 indicates the counting of the load for each terminal. In this discussion, "load per terminal" is understood to mean the number of segments that terminate at a given terminal.

Block 510 indicates the sorting of the terminals from smallest load to largest load, and assigning a terminal index to each terminal based on the sort. This sorting is the origin of the name of the "lightload first" method. In an alternative embodiment, the sorting is form largest load to smallest load, but the "lightload first" approach generally provides better results.

Block 512 indicates the initialization of terminal indexes I and J, which are used as loop indexes (described below). Initially, I=2 and J=1.

Block 514 indicates the initialization of a segment index S to a value of 1; S is used as a loop index (described below). Block 514 also shows setting of a parameter $S_{MAX}$ to be the total load, the total number of segments present between terminal I and terminal J. $I_{MAX}$ is initialized to be the largest terminal index (that is, the total number of terminals).

Block 516 is the beginning block of three nested loops governed by segment index S, terminal index J, and terminal index I. In block 516, the smallest available wavelength (λ) is assigned in terminals I and J, and on all links on the I-J segment.

Thereafter, in block 518, the mux/demux groups are deployed, supporting the assignment of wavelengths made in block 516. The term deployed is shown in quotes to indicate that the deployment need not be physical deployment of the actual mux/demux group "boxes"; the term "deploy" may mean execution of a step in computer software such as adding a mux/demux group data structure, in which case the physical deployment of mux/demux group "boxes" occurs at a later time.

Blocks 516 and 518 are repeated in each iteration of the most deeply nested loop governed by loop indexes S, J, and I.

The innermost loop includes blocks 516, 518 and 530. Block 530 indicates the incrementing of segment index S and comparison of the incremented S to $S_{MAX}$. The loop is repeated as long as S is less than or equal to $S_{MAX}$, but the loop is exited to block 540 when S is finally incremented to exceed its maximum value $S_{MAX}$.

The middle loop includes blocks 516, 518, 530 and 540. Block 540 indicates the incrementing of terminal index J and comparison of the incremented J to I. The loop is repeated as long as J is less than I, but the loop is exited to block 550 when J is finally incremented to equal I.

Finally, the outermost loop includes blocks 516, 518, 530, 540 and 550. Block 550 indicates the incrementing of terminal index I and comparison of the incremented I to its maximum value $I_{MAX}$. The outermost loop is repeated as long as I is less than or equal to $I_{MAX}$, but the loop is exited when I is finally incremented to exceed its maximum value $I_{MAX}$.

After the outermost loop is exited, control passes to a block 599 which may indicate an outputting of the "deployment" that occurred in block 518. For example, such an output may involve printing a list of mux/demux groups required to be physically deployed at each terminal.

The lightload-first method works well in most cases. However, in some cases, there is room for improvement. For example, given the network in FIG. 2B, assume the number of segments between A and B is 8, but the number of segments between A and C is 20, and there is no traffic between B and C. Then the lightload first method produces wavelength assignment like FIG. 2A, with 5 mux/demux groups.

Figure 3A:
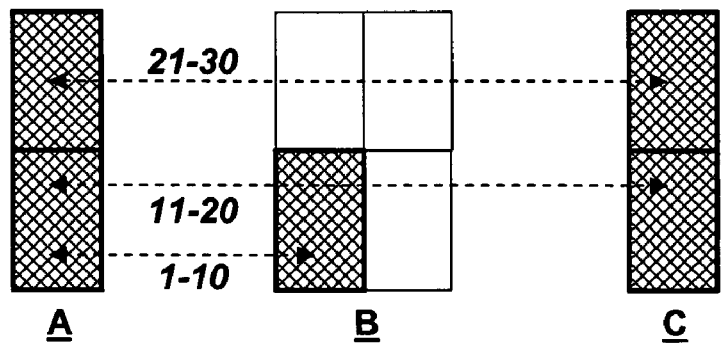
FIGS. 3A, 3B (collectively called "FIG. 3") illustrate mux/demux structures at three nodes, in which each terminal can have two mux/demux groups, each supporting up to 20 wavelengths; cross-hatched (shaded) boxes indicate installed mux/demux groups whereas unshaded boxes indicate where mux/demux groups do not have to be installed; assuming 10 traffic segments from A to B and 20 traffic segments from A to C.
Figure 3B:
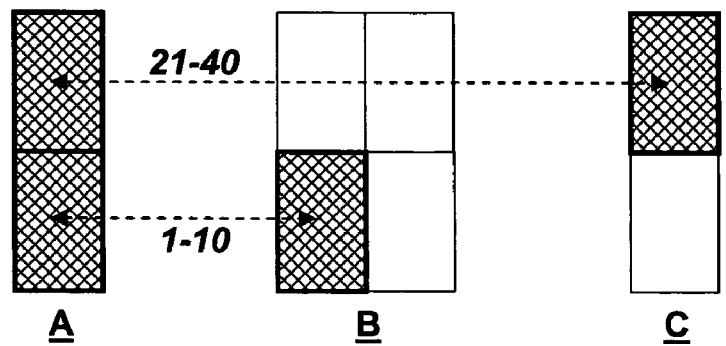

However, there is another wavelength assignment solution with four mux/demux groups only (see FIG. 3B). A problem of the lightload-first method comes from the first-fit method. Since one knows the total traffic T(i,j) between terminals i and j, one can fit them with the least number of mux/demux groups.

FIGS. 3A, 3B illustrate a mux/demux structures at three nodes, in which each termination can have two mux/demux groups, each supporting up to 20 wavelengths; cross-hatched (shaded) boxes indicate installed mux/demux groups. Assuming 10 traffic segments from A to B and 20 traffic segments from A to C, FIG. 3A shows results according to the lightload-first greedy wavelength assignment method, and FIG. 3B shows wavelength assignment according to a modified lightload-first method to be described as follows.

In FIG. 3, after assigning wavelength on traffic segments between A and B, assign wavelengths on traffic segments between A and C. These 20 traffic segments fit into two groups using a first-fit method. However, since the twenty segments fit into a single mux/demux group, they can be assigned wavelengths in the second mux/demux group.

Table II represents one embodiment of the modified (improved) lightload-first method:

TABLE II

Modified Lightload-First Method

1. Sort the terminal index from the smallest load to the largest load, i.e., t(i) ≦ t(i+1)
2. Start with i=2.
3. For j=1 to i−1, wavelength assignment on segments between i and j, T(i,j),
   3a. Segments available at both i and j
   3b. Segments available on all links on the shortest path between i and j
   3c. Carry out first fit wavelength assignment
   3d. After first-fit wavelength assignment on T(i,j), if T(i,j) can't be fit with the existing mux/demux group(s) entirely, fit them with the least number of mux/demux group(s) as long as it does not increase the total number of groups.
4. Deploy mux/demux group(s) that support(s) the assigned wavelength(s) accordingly.
5. Update to the next terminal, i=i+1 and go to step 3.

Figure 6A:
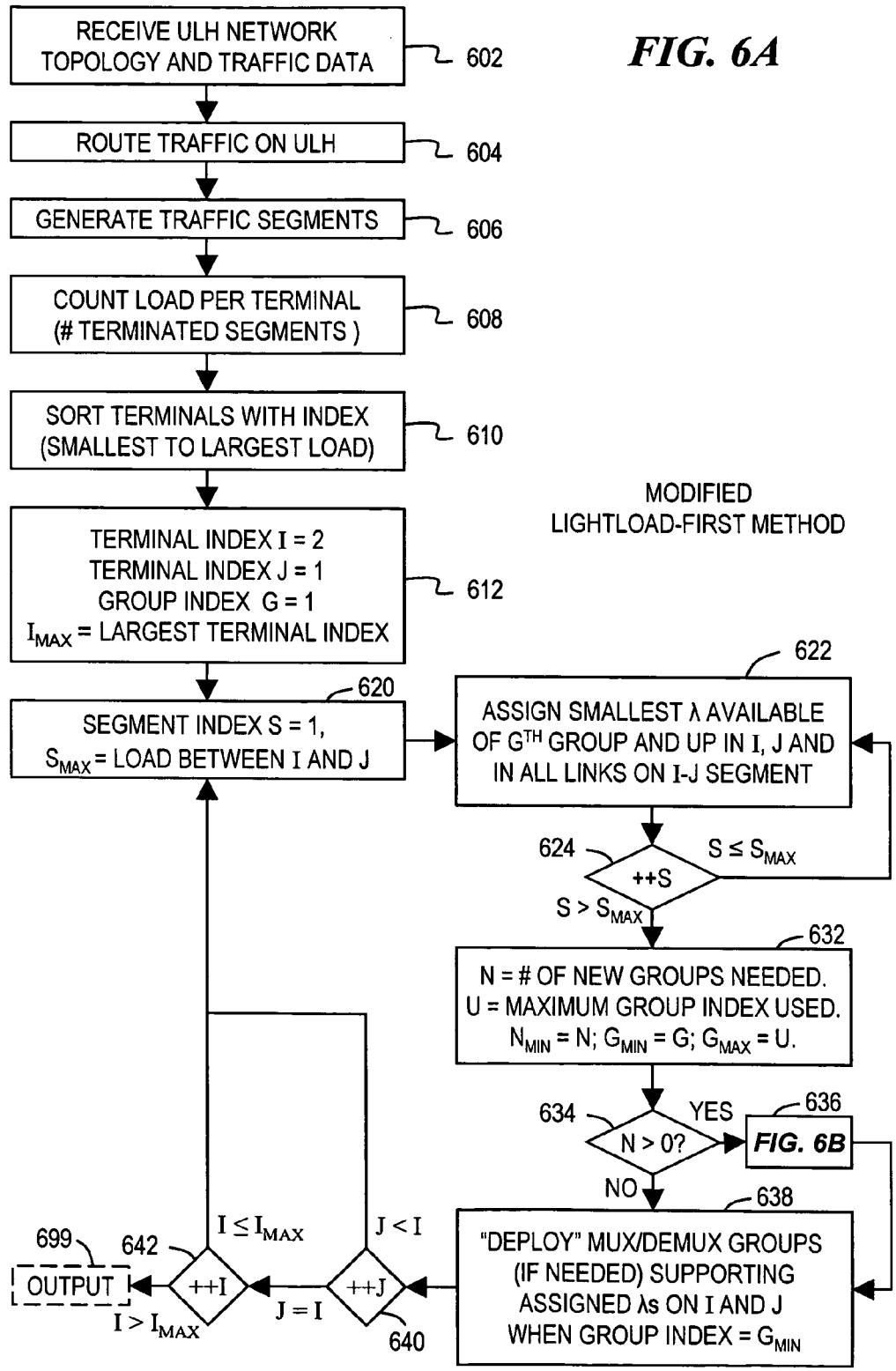
FIGS. 6A, 6B (collectively called "FIG. 6") is a flowchart of one embodiment of a modified lightload-first method of wavelength assignment.
Figure 6B:
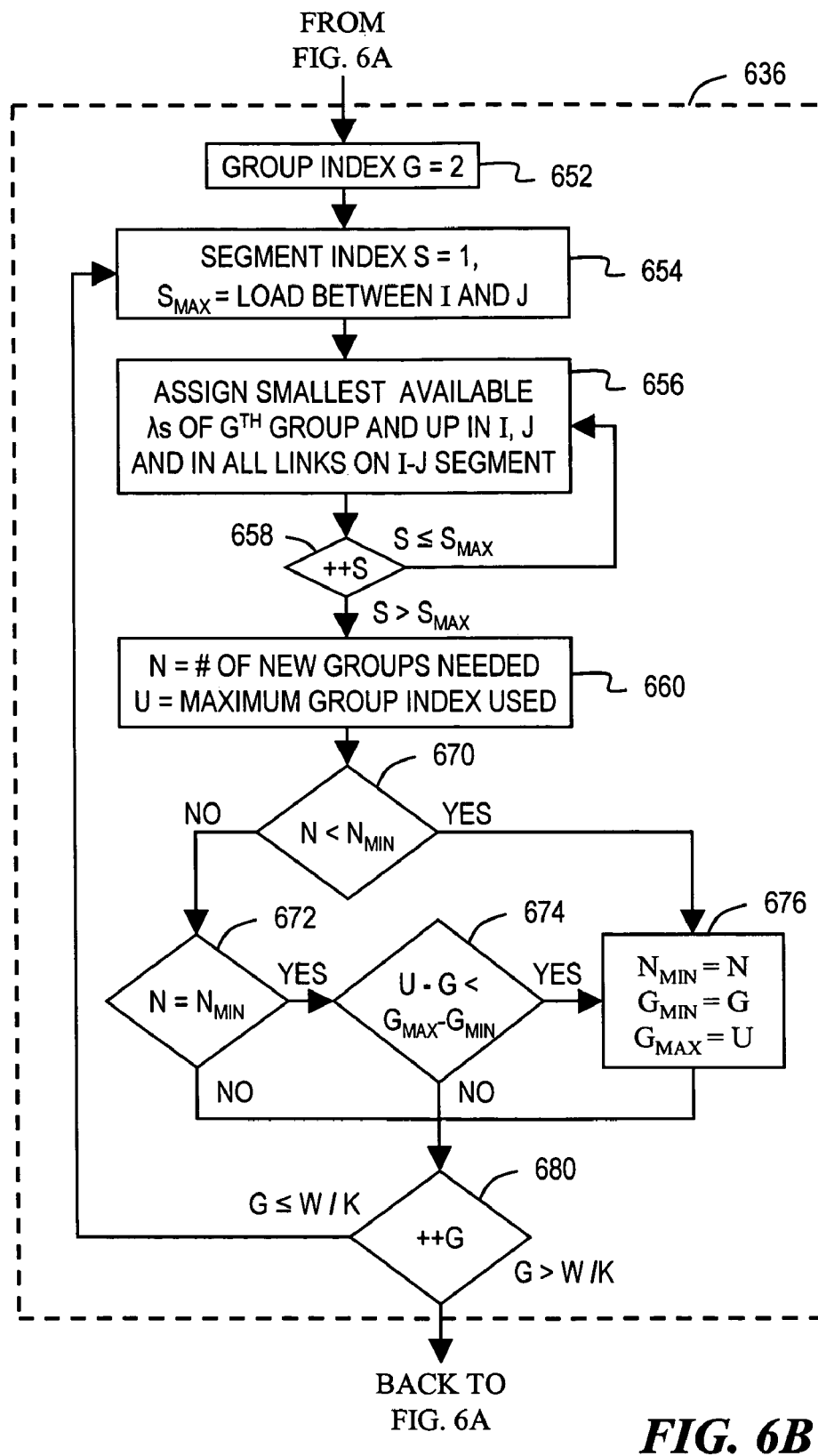

FIGS. 6A, 6B (collectively called "FIG. 6") is a flowchart of one embodiment of a modified (or improved) lightload-first method of wavelength assignment.

Blocks 602, 604, 606, 608, and 610 correspond to steps 502, 504, 506, 508, and 510, described above, and are not described repetitively.

Block 612 indicates the initialization of terminal indexes I and J, which are used as loop indexes (described below). Initially, I=2 and J=1. The maximum value of I, $I_{MAX}$, is defined as the largest terminal index (that is, the total number of terminals). Also, a group index G is initialized to 1.

Block 620 constitutes the first block in a set of two nested loops governed by terminal indexes I and J. In block 620, segment index S is initialized to 1 and $S_{MAX}$, the maximum value of segment index S, is set equal to the load between terminals I and J.

Blocks 622 and 624 constitute a loop governed by segment index S. Block 622 indicates the assignment of the smallest available wavelength (λ) of the $G^{th}$ group and up in terminals I and J, and in all links on the I-J segment. Decision block 624 indicates the incrementing of segment index S. Loop 622, 624 is repeated as long as S has not been incremented to exceed its largest value, $S_{MAX}$. When the incremented value of S is finally incremented to exceed $S_{MAX}$, control passes to block 632.

Block 632 indicates the initializing of several parameters used in blocks 634, 636, 638. In particular, N is initialized to be the number of extra new mux/demux groups needed except existing installed mux/demux groups, as determined by all segments between terminals I and J. U represents the maximum mux/demux group index. $N_{MIN}$ is set equal to N; $G_{MIN}$ is set equal to G; and $G_{MAX}$ is set equal to U.

Decision block 634 indicates that, if the number N of needed new groups is zero (that is, if no new mux/demux group is needed), then block 638 is carried out. However, if N is greater than zero, then block 636 (detailed in FIG. 6B, described below) is carried out before block 638 is carried out. Thus, block 636 is carried out whenever there are still new groups needed as designated by block 632. Briefly, the purpose of block 636 is to find the wavelength assignments to arrive at the least number of new mux/demux groups needed.

Block 638 indicates the "deployment" of mux/demux groups that support the assigned wavelengths on terminals I and J when the group index is $G_{MIN}$. The term deployed is shown in quotes to indicate that the deployment need not be physical deployment of the actual mux/demux group "boxes"; the term "deploy" may mean execution of a step in computer software such as adding a mux/demux group data structure, in which case the physical deployment of mux/demux group "boxes" occurs at a later time.

The innermost loop extends from block 620 through block 630. Block 630 indicates the incrementing of terminal index J and comparison of the incremented J to I. The loop is repeated as long as J is less than I, but the loop is exited to block 642 when J is finally incremented to equal I.

Finally, the outermost loop extends from block 620 through block 642. Block 642 indicates the incrementing of terminal index I and comparison of the incremented I to its maximum value $I_{MAX}$. The outermost loop is repeated as long as I is less than or equal to $I_{MAX}$, but the loop is exited when I is finally incremented to exceed its maximum value $I_{MAX}$.

After the outermost loop is exited, control passes to a block 699 which may indicate an outputting of the "deployment" that occurred in block 638. For example, such an output may involve printing a list of mux/demux groups required to be physically deployed at each terminal.

Referring to FIG. 6B, the one embodiment of FIG. 6A's block 636 is now described.

Block 652 indicates the initialization of group index G to 2 before a loop is entered. The loop extends from block 654 through decision block 680, with G serving as the loop index.

Within the loop, blocks 654, 656, 658 correspond to blocks 620, 622, 624, respectively (FIG. 6A), and a repetitive description thereof is omitted.

Block 660 indicates the designation of values of N and U in the same manner as block 632 (FIG. 6A). In FIG. 6B, the values of $N_{MIN}$, $G_{MIN}$, and $G_{MAX}$ are not merely initialized as in block 632, but instead are determined by a variety of conditions.

If $N<N_{MIN}$ as determined by decision block 670, then the values of $N_{MIN}$, $G_{MIN}$, and $G_{MAX}$ are determined in block 676 in the same manner as block 632 (FIG. 6A): $N_{MIN}$ is set equal to N; $G_{MIN}$ is set equal to G; and $G_{MAX}$ is set equal to U. Of course, in FIG. 6B, the actual values of N, G and U have since been determined in blocks 660 and 652. After block 676, control passes to loop decision block 680.

If $N=N_{MIN}$, then control passes from block 670 to decision block 672. If $N=N_{MIN}$ and $U-G<G_{MAX}-G_{MIN}$ (as determined by the series of decision blocks 672, 674), then the values of $N_{MIN}$, $G_{MIN}$, and $G_{MAX}$ are determined in block 676 as described immediately above, and control passes to loop decision block 680.

If either of the conditions in decision blocks 672, 674 are not met, then control passes directly to loop decision block 680, and the values of $N_{MIN}$, $G_{MIN}$, and $G_{MAX}$ remain unchanged.

Decision block 680 indicates the incrementing of group index G and comparison of the incremented G to its maximum possible value W/K. The loop is repeated as long as the incremented value of G is less than or equal to W/K, but the loop is exited when G is finally incremented to exceed its maximum value W/K. After exiting the loop, control returns to block 638 (FIG. 6A).

In practice, a traffic forecast is often either not available or not reliable. Operators usually assign wavelengths and deploy the corresponded mux/demux groups as demand requests arrive. This is the growth scenario (see Table III).

In the growth scenario with dynamic traffic arrivals, network grows as traffic grows. In the network, there is existing deployed traffic, which is the set of segments deployed in the existing network already, and can not be moved or interrupted. When new demands arrive, seeking for budget approval to be deployed immediately without knowing the future arrivals, the network should support the new demand with minimum investment, but avoid excessive penalties in the future with future traffic forecasts, which is the set of demands representing the forecast to final traffic load of the network.

One premise of the reservation method (Table III) is first to classify "major" terminals (more than one mux/demux group) and "minor" terminals (one mux/demux group) according to future traffic forecasts. Then the method leaves the first mux/demux group to segments terminating at minor terminals. However, if too many wavelengths at the first mux/demux group are unused, especially at the final stage of the network design, some wavelengths at the first mux/demux group would be wasted, which may result in more total mux/demux groups deployed than necessary.

To overcome this drawback, two terminal parameters, A and B, are defined. Parameter A stands for the total number of segments terminated at all mux/demux groups, and B stands for the number of segments terminated at the first mux/demux group only at the current stage. These two parameters control the amount of wavelengths ($\lambda$s) left at the first mux/demux-group. As network deployment is close to the final stage, wavelength assignment starts from the first mux/demux group. In practical deployments, operators may require that the second mux/demux group not be deployed until the first mux/demux group has been filled to at least some threshold. The reservation method, described below, accommodates this feature.

The reservation method works in two steps. First one uses a lightload-first method on present and future segments with existing segments to determine major terminals and minor terminals. Then one decides whether to reserve the first mux/demux group for future traffic. One embodiment of the reservation method is shown in Table III:

TABLE III

Reservation Method
(Growth Scenario with Dynamic Segment Arrivals)

1. Perform modified lightload-first method on present and future segments on network.
2. For each terminal i, if the number of mux/demux groups is greater than 1, the terminal is referred as "major" terminal, otherwise it is classified as a "minor" terminal. Count D(i) as the number of segments terminated at the first mux/demux group, and C(i) as the total number of segments terminated at terminal i.
3. To assign wavelength on present traffic segment, define A(i) as the existing traffic load and B(i) as the used wavelength at the first mux/demux-group at terminal i.
4. If:
   the present traffic is between two major terminals i and j
   B(i)>K*Threshold
   A(i)/C(i) ≦ B(i)/D(i)
   B(j)>K*Threshold
   A(j)/C(j)≦B(j)/D(j)
   then start assigning traffic on a wavelength from the 2nd mux/demux group and up using first-fit method. If no available wavelength is found, try with the first mux/demux-group before adding another fiber pair to the most congested link on the traffic shortest path.
5. Otherwise assign traffic on a wavelength searching from the first wavelength and up using first-fit heuristic method. If no available wavelength is found, add another fiber pair to the most congested link on the traffic shortest path until the demand is assigned.

Figure 7:
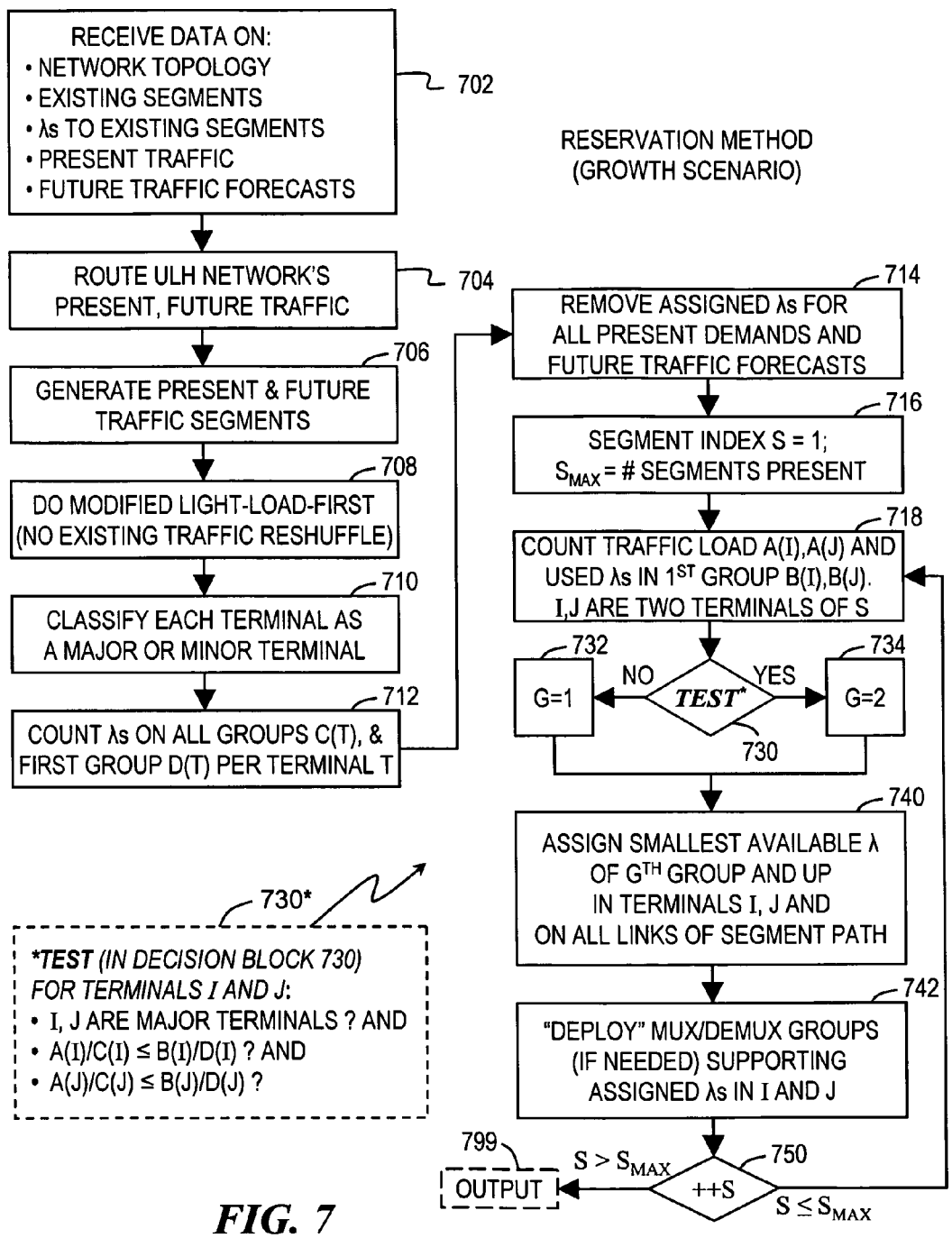
FIG. 7 is a flowchart of dynamic wavelength assignment in a network "growth scenario" as new traffic segments arrive.

FIG. 7 is a flowchart of dynamic wavelength assignment in one embodiment of the reservation method for handling the network "growth scenario"—as new traffic demands arrive.

Block 702 indicates the preliminary step of gathering data, such as network topology, existing segments, wavelengths ($\lambda$s) on existing segments, deployed mux/demux groups, present traffic, and future traffic forecasts. Future traffic forecasts, which are the set of demands representing the forecast to final traffic load of the network, may not be accurate, but each network must have its future traffic forecasts.

Block 704 indicates the routing of present demands and future traffic forecasts on the ULH network. Briefly, this routing could be any routing scheme, such as shortest path routing.

Block 706 indicates the generation of present and future traffic forecast segments. Briefly, this segment generation involves splitting demand routes into different parts, the distance of each part not being longer than the ULH reach.

Block 708 indicates virtual application of the modified lightload-first method (see, for example, the embodiment of FIGS. 6A, 6B) on the generated segments from present demands and future forecasts. Alternatively, the lightload-first method (see, for example, the embodiment of FIG. 5) may be performed while the existing traffic wavelength assignment is not changed. Then the wavelengths are virtually assigned to the segments of present demands and future forecasts on the network.

Block 710 indicates the classification of each terminal as either a "major" or a "minor" terminal. In this context, a major terminal has more than one mux/demux group, and a minor terminal has one mux/demux group.

Block 712 indicates the counting of wavelengths (λs) on all mux/demux groups to yield a number C(t) for each terminal t, and the counting of wavelengths (λs) on the first mux/demux group to yield another number D(t) for each terminal t after applying the modified lightload-first algorithm.

Block 714 indicates the removal of assigned wavelengths (λs) for all segments of present demands and future traffic forecasts on computer. Briefly, this removal involves data structure changes and is performed because we are simply simulating the final stage of the network to record major/minor nodes and numbers D(t) and C(t) for each terminal t for a subsequent step, assigning real wavelengths to present traffic segments.

Block 716 indicates the initialization of a segment index S to 1, and the setting of parameter $S_{MAX}$ to equal the number of segments generated by present demands.

Block 718 constitutes the entry point to a loop whose loop index is segment index S that was just initialized in block 716. Segment S it has two terminals I and J. At the current network stage, the total number of wavelengths used in terminals I and J are counted as A(I) and A(J), while the number of wavelengths used in the first mux/demux group in terminals I and J are counted as B(I) and B(J).

Decision block 730 represents a decision as to whether a test has been passed. Inset block 730* specifies that the test is whether, for terminals I and J, all three conditions are fulfilled:

I and J are "major" terminals (having more than one mux/demux group);
A(I)/C(I)≦B(I)/D(I); and
A(J)/C(J)≦B(J)/D(J).

A, B, C, and D were defined in blocks 712 and 718.

If these conditions are not met, then G is set to 1 in block 732. However, if all conditions were met, then G is set to 2 in block 734. In either event, control subsequently passes to block 740.

Block 740 indicates the assignment of the smallest available wavelength (λ) of the $G^{th}$ group and above, in terminals I and J and on all links of the segment path.

Block 742 indicates the "deployment" of mux/demux groups in terminals I and J, in accordance with the wavelength assignment performed in block 740. The term deployed is shown in quotes to indicate that the deployment need not be physical deployment of the actual mux/demux group "boxes"; the term "deploy" may mean execution of a step in computer software such as adding a mux/demux group data structure, in which case the physical deployment of mux/demux group "boxes" occurs at a later time.

Decision block 750 indicates the incrementing of segment index S and comparison of the incremented S to its maximum value $S_{MAX}$. The loop is repeated as long as the incremented value of S is less than or equal to $S_{MAX}$, but the loop is exited, and one execution of the method is complete, when S is finally incremented to exceed its maximum value $S_{MAX}$, which is the number of segments of the present demands.

After the loop is exited, control passes to a block 799 which may indicate an outputting of the "deployment" that occurred in block 742. For example, such an output may involve printing a list of mux/demux groups required to be physically deployed at each terminal.

The methods described herein may best be implemented on any appropriate general purpose computer systems employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

In simulation experiments, the performance of the heuristics described above were simulated on an actual nationwide ULH optical network design with traffic forecast. Results of the total mux/demux costs were compared with the corresponding theoretical lower bounds and upper bounds. The lower bound is obtained by assuming that no additional mux/demux group is needed until all the slots in the existing mux/demux groups are used. The upper bound is obtained by assuming that each terminal is fully equipped with all mux/demux groups for each of the fiber pair to achieve "any-wavelength-to-any-node" operation. The simulation was done with various network loads.

Simulation results show that simply by applying the present heuristic methods for wavelength assignment and incremental mux/demux group deployment, significant reduction on the total number of mux/demux groups is realized, compared to the simple and naive "any-wavelength-to-any-node" deployment (i.e., the upper bound)—more than 50% reduction in most cases. The heuristics perform very close to the lower bounds except with high network utilization.

From the foregoing, it will be apparent to those skilled in the art that a variety of methods, systems, computer program products, and the like, are provided.

The foregoing description provides support for a first method (FIG. 5—Light-Load First). An optical network has nodes that include optical add drop multiplexers (OADMs) that contain at least one terminal with at least one multiplex-demultiplex (mux/demux) group that is configured to multiplex and demultiplex a predetermined maximum number K of optical wavelengths per group. The method assigns wavelengths of fiber links and mux/demux groups to given traffic or traffic segments in the network, so as to minimize, over all terminals, a total number of mux/demux groups required to carry the given traffic or traffic segments. The method may involve (510) sorting the terminals in order of size of load. Further, the method may involve, for each traffic segment between pairs of first and second terminals, (516) assigning a smallest wavelength that is available between the first and second terminals and that is available on the segment path between the first and second terminals; and (518) in the first and second terminals, deploying mux/demux groups supporting the assigned wavelengths, so as to minimize, over all terminals, the total number of mux/demux groups.

The sorting step (510) may include sorting the terminals in order of increasing load, so that a lightest-load terminal is first.

The sorting step (510) may include sorting the traffic loads between terminal pairs in increasing order, so that a lightest-load terminal pair is first.

The deploying step (518) may include adding, in computer software, any new mux/demux group data structure(s) needed to support any newly assigned (516) wavelength(s); and the method may further involve, after the assigning (516) and deploying (518) steps, outputting a list of mux/demux groups required for physical deployment at each terminal.

The deploying step (518) may include using capacity in an already deployed mux/demux group to support any newly assigned (516) wavelength(s).

The present disclosure further supports (FIGS. 6A, 6B) a modified light-load first method. An optical network has nodes that include optical add drop multiplexers (OADMs) that contain at least one terminal with at least one multiplex-demultiplex (mux/demux) group that is configured to multiplex and demultiplex a predetermined maximum number K of optical wavelengths per group. The method for assigns wavelengths of fiber links and mux/demux groups to given traffic or traffic segments in the network, so as to minimize, over all terminals, a total number of groups required to carry the given traffic or traffic segments. The method may involve (610) sorting the terminals in order of size of load. Moreover, the method may involve, for traffic segments between pairs of first and second terminals, (622) assigning smallest wavelengths that are available between the first and second terminals and that are available on a segment path between the first and second terminals; (636) if the assignment of wavelengths does not fit within existing groups, re assigning wavelengths in fewest groups in a manner not to increase the total number of required mux/demux groups; and (638) in the first and second terminals, deploying groups supporting the assigned wavelengths, so as to minimize, over all terminals, the total number of mux/demux groups.

The sorting step (610) may involve sorting the terminals in order of increasing load, so that a lightest-load terminal is first.

The sorting step (610) may involve sorting the traffic loads between terminal pairs in increasing order, so that a lightest-load terminal pair is first.

The deploying step (638) may involve adding, in computer software, any new mux/demux group data structure(s) needed to support any newly assigned (622, 656) wavelength(s); and the method may further involve, after the assigning (622, 656) and deploying (638) steps, outputting a list of mux/demux groups required for physical deployment at each terminal.

The deploying step (638) may include using capacity in an already deployed mux/demux group to support any newly assigned (622, 656) wavelength(s).

The wavelength assigning and re assigning steps (622, 636) respectively may include assigning and re-assigning wavelengths to a capacity of previously deployed mux/demux groups to thus avoid deploying more than a necessary number of mux/demux groups.

The re assigning step (636) may involve iteratively (658) re-assigning (656) for each segment, smallest wavelengths that are available between the first and second terminals and that are available on a segment path between the first and second terminals; and recalculating parameters (660-676) to decide a final wavelength assignment for the deploying step (638) so that no more than W/K mux/demux groups per terminal are deployed, wherein W is a number of wavelengths per fiber.

The present disclosure further supports (FIG. 7) a method for dealing with dynamic arrival of new segments. An optical network has nodes that include optical add drop multiplexers (OADMs) that contain at least one terminal with at least one multiplex-demultiplex (mux/demux) group that is configured to multiplex and demultiplex a predetermined maximum number K of optical wavelengths per group. The method dynamically assigns wavelengths of fiber links and mux/demux groups to newly arriving traffic, so as to minimize, over all terminals, a total number of mux/demux groups required to carry all traffic even with the newly arriving traffic joining the terminals. The method may involve (708) performing the "modified light-load" method on present and future forecast traffic segments, so as to classify plural-group terminals as major terminals and single-group terminals as minor terminals; assigning wavelengths (740) for present traffic segments based on reservation conditions (730); and deploying (742) mux/demux groups supporting the assigned (740) wavelengths. the method may further involve, for each segment, performing steps including: assigning wavelengths (740) for newly arriving traffic segments based on the reservation conditions (730); and deploying (742) mux/demux groups supporting the assigned wavelengths, so as to minimize, over all terminals, the total number of mux/demux groups.

The performing step may involve simulating final stage mux/demux group status.

The reservation conditions (730) may include: I and J are major terminals in a simulated final deployment; $A(I)/C(I) \leq B(I)/D(I)$; and $A(J)/C(J) \leq B(J)/D(J)$; in which (712, 718) I and J denote respective terminals used in arguments for A, B, C, and D; A denotes a total number of wavelengths used in a terminal; B denotes a number of wavelengths used in a first mux/demux group in a terminal; C denotes a number of wavelengths on all mux/demux groups for a terminal in the simulated final deployment, and D denotes a number of wavelengths on a first mux/demux group for a terminal in the simulated final deployment.

The method may further involve deciding, based on the reservation conditions (730), whether or not to reserve wavelengths on a first mux/demux group for future demands.

The present disclosure further provides support for systems configured to perform the methods described herein.

The present disclosure also supports computer program products including computer executable code or computer executable instructions that, when executed, causes the computer to perform the methods described herein.

Many alternatives, modifications, and variations will be apparent to those skilled in the art in light of the above teachings. For example, the number and relative location and interconnection of elements may be varied while remaining within the scope of the present invention. Likewise, the steps involved in methods described herein may be implemented in a manner different than as described above. It is therefore to be understood that within the scope of the appended claims and their equivalents, the invention may be practiced otherwise than as specifically described herein.

What is claimed is:

1. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for assigning wavelengths of fiber links and mux/demux groups to given traffic or traffic segments in the network, so as to minimize, over all terminals, a total number of mux/demux groups required to carry the given traffic or traffic segments, the method comprising:
    a) sorting the terminals in order of size of load; and
    for each traffic segment between pairs of first and second terminals:
    b) assigning a smallest wavelength that is available between the first and second terminals and that is available on the segment path between the first and second terminals; and
    c) in the first and second terminals, deploying mux/demux groups supporting the assigned wavelengths, so as to minimize, over all terminals, the total number of mux/demux groups;
    wherein the sorting step includes sorting the terminals in order of increasing load, so that a lightest-load terminal is first.

2. A system configured to perform the method of claim 1.

3. A computer readable medium including computer executable code or computer executable instructions that, when executed, causes the computer to perform the method of claim 1.

4. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for assigning wavelengths of fiber links and mux/demux groups to given traffic or traffic segments in the network, so as to minimize, over all terminals, a total number of mux/demux groups required to carry the given traffic or traffic segments, the method comprising:
    a) sorting the terminals in order of size of load; and
    for each traffic segment between pairs of first and second terminals:
    b) assigning a smallest wavelength that is available between the first and second terminals and that is available on the segment path between the first and second terminals; and
    c) in the first and second terminals, deploying mux/demux groups supporting the assigned wavelengths, so as to minimize, over all terminals, the total number of mux/demux groups;
    wherein the sorting step includes sorting the traffic loads between terminal pairs in increasing order, so that a lightest-load terminal pair is first.

5. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for assigning wavelengths of fiber links and mux/demux groups to given traffic or traffic segments in the network, so as to minimize, over all terminals, a total number of mux/demux groups required to carry the given traffic or traffic segments, the method comprising:
    a) sorting the terminals in order of size of load; and
    for each traffic segment between pairs of first and second terminals:
    b) assigning a smallest wavelength that is available between the first and second terminals and that is available on the segment path between the first and second terminals; and
    c) in the first and second terminals, deploying mux/demux groups supporting the assigned wavelengths, so as to minimize, over all terminals, the total number of mux/demux groups;
    wherein:
    the deploying step includes adding any new mux/demux group data structure(s) needed to support any newly assigned wavelength(s); and
    the method further comprises, after the assigning and deploying steps, outputting a list of mux/demux groups required for physical deployment at each terminal.

6. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for assigning wavelengths of fiber links and mux/demux groups to given traffic or traffic segments in the network, so as to minimize, over all terminals, a total number of mux/demux groups required to carry the given traffic or traffic segments, the method comprising:
    a) sorting the terminals in order of size of load; and
    for each traffic segment between pairs of first and second terminals:
    b) assigning a smallest wavelength that is available between the first and second terminals and that is available on the segment path between the first and second terminals; and
    c) in the first and second terminals, deploying mux/demux groups supporting the assigned wavelengths, so as to minimize, over all terminals, the total number of mux/demux groups;
    wherein the deploying step includes using capacity in an already deployed mux/demux group to support any newly assigned wavelength(s).

7. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for assigning wavelengths of fiber links and mux/demux groups to given traffic or traffic segments in the network, so as to minimize, over all terminals, a total number of groups required to carry the given traffic or traffic segments, the method comprising:
    a) sorting the terminals in order of size of load; and
    for traffic segments between pairs of first and second terminals:
    a) assigning smallest wavelengths that are available between the first and second terminals and that are available on a segment path between the first and second terminals;

b) if the assignment of wavelengths does not fit within existing mux/demux groups, re-assigning wavelengths in fewest groups in a manner not to increase the total number of required mux/demux groups; and c) in the first and second terminals, deploying mux/demux groups supporting the assigned wavelengths, so as to minimize, over all terminals, the total number of mux/demux groups.

8. The method of claim 7, wherein the sorting step includes:

sorting the terminals in order of increasing load, so that a lightest-load terminal is first.

9. The method of claim 7 wherein the sorting step includes:

sorting the traffic loads between terminal pairs in increasing order, so that a lightest-load terminal pair is first.

10. The method of claim 7, wherein:

the deploying step includes adding any new mux/demux group data structure(s) needed to support any newly assigned wavelength(s); and the method further comprises, after the assigning and deploying steps, outputting a list of mux/demux groups required for physical deployment at each terminal.

11. The method of claim 7, wherein:

the deploying step includes using capacity in an already deployed mux/demux group to support any newly assigned wavelength(s).

12. The method of claim 7, wherein the wavelength assigning and re-assigning steps respectively include:

assigning and re-assigning wavelengths to a capacity of previously deployed mux/demux groups to thus avoid deploying more than a necessary number of mux/demux groups.

13. The method of claim 7, wherein the re-assigning step includes:

iteratively re-assigning for each segment, smallest wavelengths that are available between the first and second terminals and that are available on a segment path between the first and second terminals; and recalculating parameters to decide a final wavelength assignment for the deploying step so that no more than W/K mux/demux groups per terminal are deployed, wherein W is a number of wavelengths per fiber.

14. In an optical network having nodes that include optical add drop multiplexers (OADMs) that contain at least one terminal with at least one multiplex-demultiplex (mux/demux) group that is configured to multiplex and demultiplex a predetermined maximum number K of optical wavelengths per group, a method for dynamically assigning wavelengths of fiber links and mux/demux groups to newly arriving traffic, so as to minimize, over all terminals, a total number of mux/demux groups required to carry all traffic even with the newly arriving traffic joining the terminals, the method comprising:

a) performing the method of claim 7 on present and future forecast traffic segments, so as to classify plural-group terminals as major terminals and single-group terminals as minor terminals;

b) assigning wavelengths for present traffic segments based on reservation conditions; and c) deploying mux/demux groups supporting the assigned wavelengths; and for each segment, performing steps including:

d) assigning wavelengths for newly arriving traffic segments based on the reservation conditions; and e) deploying mux/demux groups supporting the assigned wavelengths, so as to minimize, over all terminals, the total number of mux/demux groups.

15. The method of claim 14, wherein the performing step includes:

simulating final stage mux/demux group status.

16. The method of claim 14, wherein the reservation conditions include:

I and J are major terminals in a simulated final deployment;

$A(I)/C(I) \leqq B(I)/D(I)$; and $A(J)/C(J) \leqq B(J)/D(J)$;

wherein:

I and J denote respective terminals used in arguments for A, B, C, and D;

A denotes a total number of wavelengths used in a terminal;

B denotes a number of wavelengths used in a first mux/demux group in a terminal;

C denotes a number of wavelengths on all mux/demux groups for a terminal in the simulated final deployment, and D denotes a number of wavelengths on a first mux/demux group for a terminal in the simulated final deployment.

17. The method of claim 14, further comprising:

deciding, based on the reservation conditions, whether or not to reserve wavelengths on a first mux/demux group for future demands.

18. A system configured to perform the method of claim 7.

19. A computer readable medium including computer executable code or computer executable instructions that, when executed, causes the computer to perform the method of claim 7.

* * * * *